US010972987B2

(12) United States Patent
Akkarakaran et al.

(10) Patent No.: US 10,972,987 B2
(45) Date of Patent: Apr. 6, 2021

(54) SYSTEM AND METHODS FOR FAST POWER HEADROOM REPORTING

(71) Applicant: QUALCOMM Incorporated, San Diego, CA (US)

(72) Inventors: Sony Akkarakaran, Poway, CA (US); Tao Luo, San Diego, CA (US); Juan Montojo, San Diego, CA (US); Xiao Feng Wang, San Diego, CA (US); Shengbo Chen, San Diego, CA (US); Sumeeth Nagaraja, San Diego, CA (US); Makesh Pravin John Wilson, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 40 days.

(21) Appl. No.: 16/139,990

(22) Filed: Sep. 24, 2018

(65) Prior Publication Data

US 2019/0098586 A1 Mar. 28, 2019

Related U.S. Application Data

(60) Provisional application No. 62/563,391, filed on Sep. 26, 2017.

(51) Int. Cl.
*H04W 52/36* (2009.01)
*H04W 24/10* (2009.01)
(Continued)

(52) U.S. Cl.
CPC .......... *H04W 52/365* (2013.01); *H04B 7/043* (2013.01); *H04B 7/0404* (2013.01);
(Continued)

(58) Field of Classification Search
CPC .... H04B 7/0404; H04B 7/043; H04B 7/0617; H04L 5/0025; H04L 5/0051;
(Continued)

(56) References Cited

U.S. PATENT DOCUMENTS

2011/0080881 A1* 4/2011 Hsu ..................... H04W 52/365
370/329
2011/0105173 A1* 5/2011 Haim .................. H04W 52/244
455/522

(Continued)

FOREIGN PATENT DOCUMENTS

WO WO-2009154403 A2 12/2009
WO WO-2017082810 A1 5/2017

OTHER PUBLICATIONS

Huawei, et al., "Consideration on PHR with Multi-beam Operation," 3GPP Draft; R2-1709266 Consideration on PHR with Multiple Beams Operation, 3rd Generation Partnership Project (3GPP), Mobile Competence Centre; 650, Route Des Lucioles; F-06921 Sophia-Antipolis Cedex, vol. RAN WG2, No. Berlin, Germany; Aug. 21, 2017-Aug. 25, 2017, Aug. 20, 2017, XP051319030, 5 pages, Retrieved from the Internet: URL: http://www.3gpp.org/ftp/Meetings_3GPP_SYNC/RAN2/Docs/ [retrieved on Aug. 20, 2017].
(Continued)

*Primary Examiner* — Yuwen Pan
*Assistant Examiner* — Paul P Tran
(74) *Attorney, Agent, or Firm* — Arent Fox, LLP (57) ABSTRACT

A user equipment (UE) may transmit a power headroom report in response to changing beamforming parameters. The UE may autonomously change beamforming parameters from a preconfigured set of beams or receive a command to change beamforming parameters for transmissions on a new beam. The UE may determine a power headroom applicable to a transmission from the UE on the new beam. The UE may transmit, in response to the command, a power
(Continued)

headroom report based on the power headroom using resources configured for the power headroom report. For example, the power headroom report may be multiplexed with an uplink transmission from the UE using the new beam. In an aspect, the UE may select a scheduled transmission during a time period after the command is implemented as the uplink transmission. For example, the power headroom report may be transmitted as a physical layer transmission or as a MAC-CE transmission.

26 Claims, 5 Drawing Sheets

(51) Int. Cl.
| | |
|---|---|
| H04L 5/00 | (2006.01) |
| H04W 52/24 | (2009.01) |
| H04W 52/42 | (2009.01) |
| H04B 7/0426 | (2017.01) |
| H04W 72/12 | (2009.01) |
| H04B 7/06 | (2006.01) |
| H04B 7/0404 | (2017.01) |
| H04W 72/04 | (2009.01) |
| H04W 72/02 | (2009.01) |

(52) U.S. Cl.
CPC ......... *H04B 7/0617* (2013.01); *H04L 5/0053* (2013.01); *H04W 24/10* (2013.01); *H04W 52/246* (2013.01); *H04W 52/42* (2013.01); *H04W 72/0413* (2013.01); *H04W 72/1268* (2013.01); *H04W 72/1289* (2013.01); *H04L 5/0025* (2013.01); *H04L 5/0051* (2013.01); *H04W 72/02* (2013.01); *H04W 72/046* (2013.01)

(58) Field of Classification Search
CPC ...... H04L 5/0053; H04L 43/16; H04W 72/02; H04W 72/0413; H04W 72/046; H04W 72/1268; H04W 72/1289; H04W 88/02; H04W 88/08; H04W 88/12; H04W 24/10; H04W 52/242; H04W 52/246; H04W 52/346; H04W 52/365; H04W 52/42

USPC ....................................................... 455/522
See application file for complete search history.

(56) References Cited

U.S. PATENT DOCUMENTS

| | | | | |
|---|---|---|---|---|
| 2011/0299407 | A1* | 12/2011 | Saito | H04B 7/0697 370/248 |
| 2012/0113818 | A1* | 5/2012 | Kim | H04W 52/365 370/248 |
| 2014/0016555 | A1* | 1/2014 | Zhao | H04W 24/10 370/328 |
| 2014/0177467 | A1* | 6/2014 | Kim | H04W 52/242 370/252 |
| 2016/0198421 | A1* | 7/2016 | Yi | H04W 52/346 370/329 |
| 2016/0337989 | A1* | 11/2016 | Chen | H04W 52/365 |
| 2017/0034789 | A1 | 2/2017 | Kim et al. | |
| 2017/0041882 | A1* | 2/2017 | Chae | H04W 52/367 |
| 2017/0290031 | A1* | 10/2017 | Hwang | H04W 72/14 |
| 2018/0279339 | A1* | 9/2018 | Lohr | H04L 5/001 |
| 2018/0324715 | A1* | 11/2018 | Ryoo | H04W 76/18 |
| 2019/0364518 | A1* | 11/2019 | Li | H04W 52/242 |
| 2020/0374866 | A1* | 11/2020 | Takeda | H04W 72/12 |

OTHER PUBLICATIONS

Partial International Search Report—PCT/US2018/052561—ISA/EPO—dated Nov. 23, 2018.
Samsung: "PHR Triggering Event for Beam Change," 3GPP Draft; R2-1709573 PHR Triggering Event for Beam Change, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, Aug. 20, 2017, XP051319289, 3 pages, Retrieved from the Internet: URL: http://www.3gpp/ftp/Meetings_3GPP_SYNC/RAN2/Docs/ [retrieved on Aug. 20, 2017].
International Search Report and Written Opinion—PCT/US2018/052561—ISA/EPO—dated Jan. 16, 2019.

\* cited by examiner

SYSTEM AND METHODS FOR FAST POWER HEADROOM REPORTING

CLAIM OF PRIORITY UNDER 35 U.S.C. § 119

This application claims priority to U.S. Provisional Application No. 62/563,391, titled "SYSTEM AND METHODS FOR FAST POWER HEADROOM REPORTING," filed Sep. 26, 2017, which is assigned to the assignee hereof, and incorporated herein by reference in its entirety.

BACKGROUND

Aspects of the present disclosure relate generally to wireless communication networks, and more particularly, to power management.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current power headroom reporting solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications including determining, at a user equipment (UE), to change one or more beamforming parameters for transmissions on a new beam. The method may include determining a power headroom applicable to a transmission from the UE on the new beam. The method may include transmitting, in response to the change, a power headroom report based on the power headroom, the power headroom report being transmitted on resources assigned for the power headroom report.

In an aspect, the disclosure provides a UE including a memory and a processor in communication with the memory. The processor may be configured to determine, at the UE, to change one or more beamforming parameters for transmissions on a new beam. The processor may be configured to determine a power headroom applicable to a transmission from the UE on the new beam. The processor may be configured to transmit, in response to the change, a power headroom report based on the power headroom, the power headroom report being transmitted on resources assigned for the power headroom report.

In another aspect, the disclosure provides a UE. The UE may include means for determining, at the UE, to change one or more beamforming parameters for transmissions on a new beam. The UE may include means for determining a power headroom applicable to a transmission from the UE on the new beam. The UE may include means for transmitting, in response to the change, a power headroom report based on the power headroom, the power headroom report being transmitted on resources assigned for the power headroom report.

In another aspect, the disclosure provides a computer-readable medium storing computer code executable by a processor of a UE for wireless communications. The computer-readable medium may include code to determine, at the UE, to change one or more beamforming parameters for transmissions on a new beam. The computer-readable medium may include code to determine a power headroom applicable to a transmission from the UE on the new beam. The computer-readable medium may include code to transmit, in response to the change, a power headroom report based on the power headroom, the power headroom report being transmitted on resources assigned for the power headroom report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to reporting of power headroom in a wireless communication system. Power headroom may refer to an amount of available power that a user equipment has available to transmit after power is allocated for a current transmission and after other constraints are applied. For example, a positive power headroom may indicate that the UE has extra available power and can transmit additional data. In contrast, a negative power headroom may indicate that the UE would like to transmit at a power greater than the UE is allowed to transmit. In LTE, a power headroom may be transmitted as a media access control (MAC) layer control element (CE) associated with a physical uplink shared channel (PUSCH) transmission. In LTE, the power headroom may be reported periodically or in response to a change in pathloss.

In a wireless communication system utilizing multi-beam communication, the power headroom may vary more quickly than in LTE. For example, beamforming gain may be a factor in determining a power headroom. The beam may be changed due to a changing orientation of the UE with respect to a base station. Additionally, maximum power emission requirements may impose constraints on transmission power based on the position of the UE with respect to a user. Therefore, a mechanism to quickly transmit information regarding power headroom may be desirable.

In an aspect, the disclosure provides a flexible power headroom reporting approach that allows power headroom information to be transmitted on scheduled layer 1 (i.e., PHY layer) transmissions or on MAC-CE associated with PUSCH transmissions. For example, the power headroom is preferably transmitted on a scheduled transmission that occurs a short time after the UE implements a beam-change command. For instance, the power headroom may be transmitted on the first available scheduled transmission.

Additional features of the present aspects are described in more detail below with respect to FIGS. 1-5.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes a new radio (NR)/5G system for purposes of example, and NR/5G terminology is used in much of the description below, although the techniques are applicable beyond NR/5G applications (e.g., to other 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
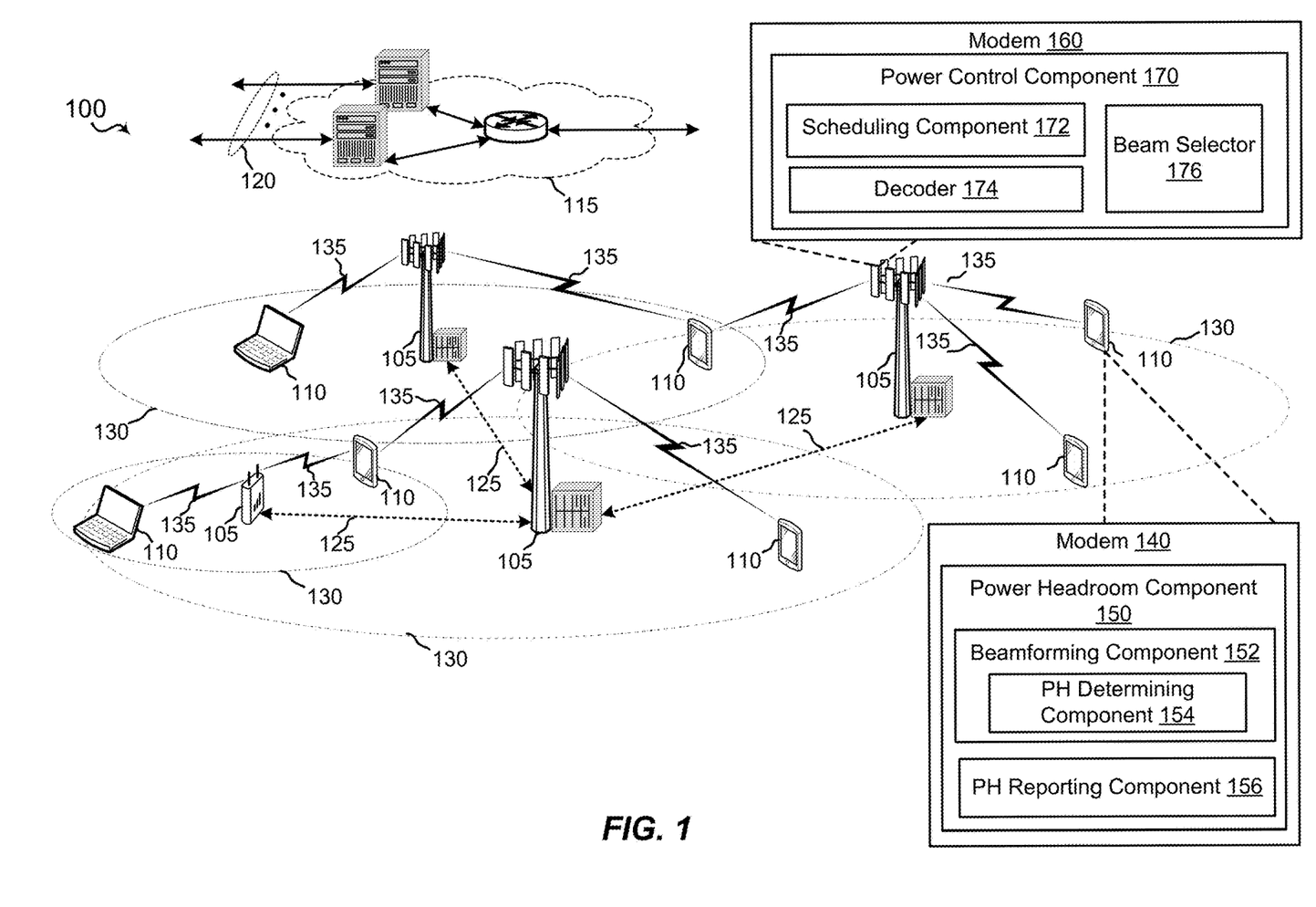
FIG. 1 is a schematic diagram of a wireless communication network including at least one user equipment (UE) having a power headroom component configured according to this disclosure to report power headroom in response to a change in beamforming parameters.

Referring to FIG. 1, in accordance with various aspects of the present disclosure, an example wireless communication network 100 includes at least one UE 110 with a modem 140 having a power headroom component 150 that determines a power headroom in response to a beam-switch command and transmits a power headroom report based on the power headroom to a base station 105. For example, the power headroom component 150 may include a beamforming component 152 for transmitting according to beamforming parameters, which may be set by the base station 105 using a beam-switch command. The power headroom component 150 may also include a power headroom (PH) determining component 154 for determining a power headroom based on the new beamforming parameters. The power headroom component 150 may also include a PH reporting component 156 for transmitting the power headroom determined by the PH determining component 154 multiplexed to an uplink transmission using the new beamforming parameters. Further, wireless communication network 100 includes at least one base station 105 with a modem 160 having a power control component 170 that receives power headroom reports from the UE 110. For example, the power control component 170 may include a scheduling component 172 for scheduling one or more uplink transmissions from the UE 110, a decoder 174 for decoding one or more uplink transmissions from the UE 110, and a beam selector 176 for selecting a beam for the UE 110 and sending a beam switch command. Thus, according to the present disclosure, the UE 110 may report changes in power headroom in response to beam switching by multiplexing a power headroom report with another transmission.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, a basic service set (BSS), an extended service set (ESS), a transmit reception point (TRP), or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, some base stations 105 may operate in a traditional sub 6 GHz spectrum, in millimeter wave (mmW) frequencies, and/or near mmW frequencies in communication with the UE 110. When a base station 105 operates in mmW or near mmW frequencies, the base station 105 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Returning to the power headroom component 150, the power headroom component 150 may receive a beam-switch command from the beam selector 176 of the base station 105. The beam-switch command may indicate a change in beam forming parameters for the UE 110. The PH determining component 154 may determine the power headroom based on a maximum effective isotropic radiated power (EIRP). The EIRP includes beamforming gain, which is different in different directions depending on the orientation of the antennas of the UE 110. For example, for a linear antenna array, beamforming gain may decrease as the beam boresight direction deviates from perpendicular to the line along which the antennas are placed. The power headroom may be determined based on power allocated to a physical uplink shared channel (PUSCH) according to closed-loop commands and open loop parameters. For example, the open-loop parameters may include a signal-to-interference-plus-noise ratio (SINR) target, fractional path-loss, scheduled bandwidth, and modulation and coding scheme (MCS). The PUSCH power may be limited to the difference between Pcmax and Ppucch, where Pcmax is a maximum per-carrier power parameter and Ppucch is the power of PUCCH transmitted in the same carrier. The PUCCH power may be determined using similar open-loop parameters where a PUCCH format serves the role of scheduled bandwidth and MCS. The maximum limit on PUCCH power may be Pcmax. Pcmax may be set by the UE 110 based on a configured Pemax, Power-class, and maximum power reduction (MPR). Pemax may be a maximum transmission power to be used in a serving cell, and may be specific to a component carrier.

As in LTE, a Type 1 power headroom may be determined per carrier as a difference between Pcmax and Ppusch-unconstrained. Ppusch-unconstrained may be a PUSCH power value that the UE 110 would use for transmitting PUSCH if the UE 110 were not constrained by Pcmax-Ppucch as discussed above. A Type 2 power headroom may be determined on carriers supporting both PUSCH and PUCCH as a difference between Pcmax and the sum of Ppusch-unconstrained and Ppucch-unconstrained. Ppucch-unconstrained may be the value that Ppucch would take if it was not limited by Pcmax.

The PH reporting component 156 may report the power headroom value determined by the PH determining component 154. The PH reporting component 156 may multiplex a power headroom report onto an uplink transmission on resources assigned for the power headroom report. In an aspect, the uplink transmission may be previously scheduled. The power headroom report may be multiplexed onto the assigned resources at a PHY layer. Accordingly, the UE 110 may not need to be scheduled on an additional transmission to transmit the power headroom report. In another example, the UE may be explicitly scheduled with an uplink transmission for the purpose of transmitting the power headroom report.

Various uplink transmissions may be used to carry the power headroom report. The uplink transmissions from the UE 110 may be scheduled by the scheduling component 172, which transmits grants to the UE 110 indicating resources for uplink transmissions. In an aspect, some transmissions may not require a grant, or may be associated with preconfigured resources. For example, a UE 110 may transmit a scheduling request (SR) on a preconfigured resource to request the base station 105 to provide a grant. Similarly, a sounding reference signal (SRS) may be periodically transmitted on preconfigured resources to allow measurement at the base station 105. In an aspect, sequence based transmission may be used with a SR or SRS to multiplex a power headroom report onto the preconfigured transmission. SR and SRS are usually transmitted with known sequences that are detected by the base station 105. Multiple sequences may be defined that allow the SR or SRS to carry the power headroom report in addition to performing the function of SR or SRS. For example, if 8 sequences are defined, a 3-bit power headroom report may be conveyed based on which sequence is selected. The decoder 174 at the base station 105 may need to decode multiple hypotheses when a power headroom report is expected on SR or SRS.

A power headroom report may also be carried on PUCCH at the PHY layer. For example, the power headroom report may be added to uplink control information (UCI). For example, the power headroom report may be encoded separately or bundled with UCI components such as the ACK, CQI, or beam related information. For example, the power headroom report may be bundled with a lowest priority UCI component. The PH reporting component 156 may include an encoder that may also apply a priority to the various UCI components to allocate encoded bits based on the priority. For example, the power headroom may be encoded with a lower priority UCI component such as CQI, or a UCI component of priority level comparable to that of the PH report. Accordingly, the encoded CQI or UCI component may also carry the PH, and may be decoded according to a table or formula, for example. The ability to carry the power headroom report may depend on the reliability (e.g., transmission power and MCS) of the PUCCH transmission. A separate encoding of the PH may increase a size of the UCI.

As discussed above, depending on the uplink transmission with which the power headroom report is multiplexed, the uplink transmission may accommodate various payload sizes. For example, in LTE, a power headroom may be reported using an 8-bit sequence, where two of the bits are reserved and 6-bits represent the value of the power headroom. For transmissions supporting smaller payloads (e.g., SR or SRS), a quantized change in the power headroom or beamforming gain may be reported instead of the value of the power headroom. Accordingly, similar granularity may be provided using fewer bits. For example, a 3-bit power headroom report indicated by a selected SR sequence may indicate a direction and degree of the quantized change. In an aspect, the PH reporting component 156 may determine the quantized change according to a table defined for a UE capability. In an aspect, the beam on which the SR or SRS is transmitted may be different from the beam on which other uplink signals (e.g., PUCCH or PUSCH) are transmitted. For example, the SRS may be beam-swept for the purpose of uplink beam management. To handle such cases, the beam on which the PH is computed may be different from the beam on which the report is actually transmitted. The beam to be used for PH computation may be indicated by the network to the UE by RRC, MAC-CE or DCI.

In an aspect, the power headroom report may also serve as an acknowledgment that the beam-switch command was received. The base station 105 may determine an expected transmission on which to receive the power headroom report. The base station 105 may decode the expected transmission under two hypotheses: 1) that the beam-switch command was received and the expected transmission includes the power headroom report and 2) the beam-switch command was not received and the expected transmission does not include the power headroom report. Accordingly, depending on which hypotheses is used to correctly decode the expected transmission, the base station 105 may determine whether the beam-switch command was correctly received. Accordingly, a separate acknowledgment for the beam-switch command may not be necessary.

In an alternative aspect, the UE 110 may be configured to dynamically select a beam from a set of UL beam directions. For example, the beamforming component 152 may select a beam based on inertial, gravitational, or magnetic measurements. In this case, the UE 110 may still experience a change in power headroom and transmit a power headroom report, as described herein. In another alternative aspect, the UE may report beamforming gain differences for multiple configured directions (e.g., in response to a configuration message). Individual power headroom reporting may not be necessary if a beamforming gain for a selected beam was previously reported.

Figure 2:
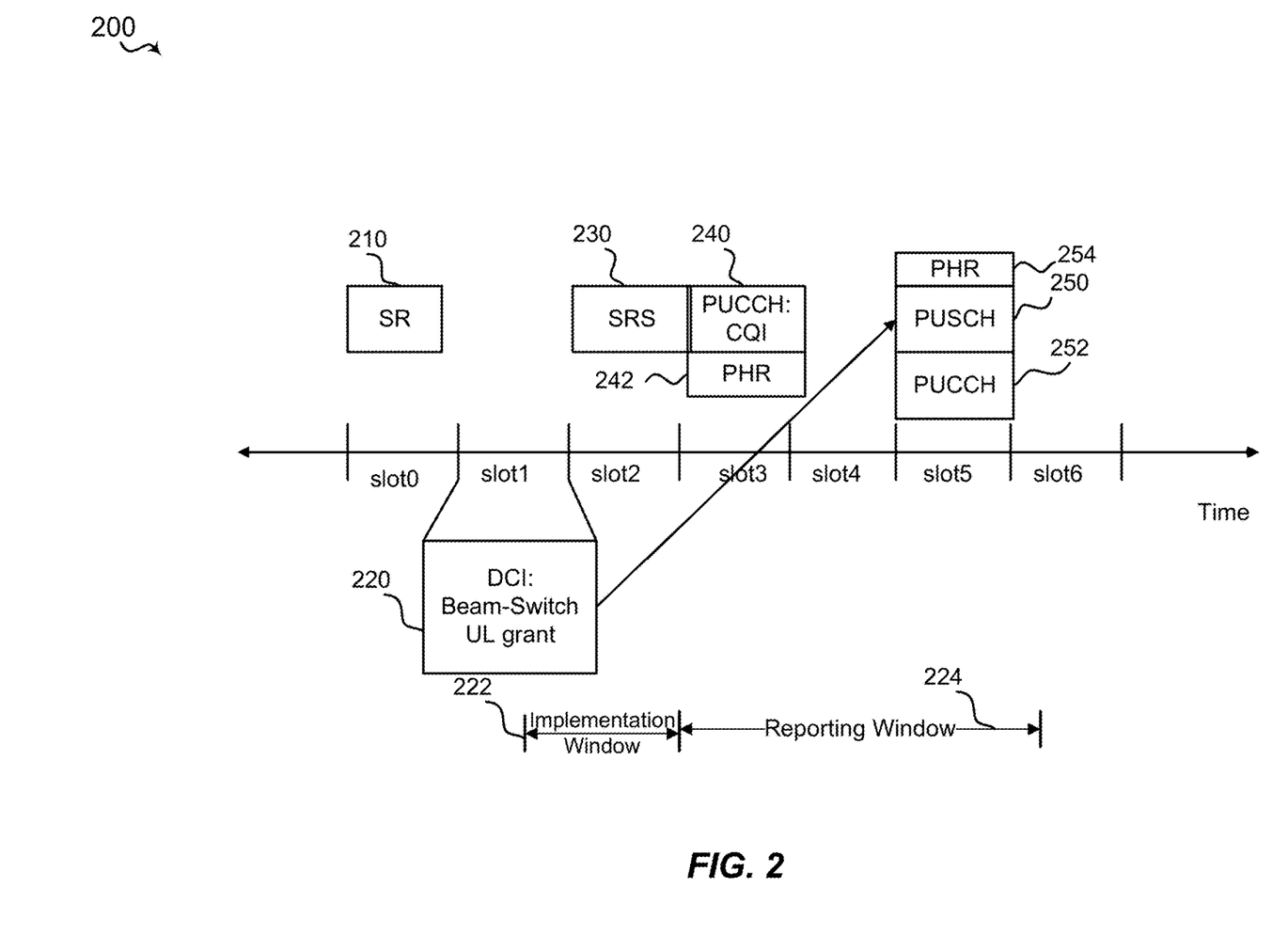
FIG. 2 is an example timeline of uplink transmissions that may be used for carrying a power headroom report.

Referring to FIG. 2, a timeline 200 illustrates selection of an uplink transmission to carry a power headroom report. The timeline 200 may be divided into slots in the time domain. The slots may further be divided into mini-slots or symbol-periods (not shown).

In an aspect, the beam-switch command may be included in a downlink DCI on PDCCH. Alternatively, the downlink DCI may schedule a downlink PDSCH carrying the beam-switch command in a MAC-CE. The DCI may indicate a resource/transmission to use for the L1 power-headroom report. Alternatively, the resource/transmission may be implicitly identified by the timing of the DCI and the uplink transmissions. For example, the PH reporting component 156 may utilize a transmission that meets timing requirements. The transmission may be the first transmission after the beam-switch command is implemented that supports a power headroom report. In another aspect, transmissions may be associated with a priority (e.g., based on reliability or payload size for the power headroom report) and a highest priority transmission during a reporting window may be selected.

As an example, in slot0, the UE 110 may transmit an SR 210 indicating the UE 110 needs a grant for transmitting data. In slot1, the base station 105 may transmit a DCI 220 including an UL grant scheduling a PUSCH transmission in slot5. The DCI 220 may also include a beam-switch command. The UE 110 may execute the beamforming component 152 to implement the beam switch command during the implementation window 222. The PH determining component 154 may determine a new power headroom based on the new beam. Accordingly, during the implementation window 222, the PH reporting component 156 may be unable to report the new power headroom. Accordingly, as illustrated, the transmission 230 in slot2 may not carry the power headroom report although the transmission 230 is after the beam-switch command because the transmission 230 occurs during the implementation window.

The reporting window 224 may be a threshold time period for reporting the power headroom. In an aspect, the transmission 240 may be the first transmission in the reporting window 224 and may be used to carry the power headroom report. As illustrated, for example, the transmission 240 may be a PUCCH carrying a periodic CQI. Accordingly, the PHR 242 may be multiplexed onto the transmission 240, for example, by bundling the PHR 242 with the CQI value prior to encoding. In another aspect, the transmission may include a PUSCH 250 and a PUCCH 252. The PUSCH 250 may support a MAC-CE full power headroom report 254. Accordingly, the PUSCH 250 may be a highest priority transmission within the reporting window and may be selected for carrying the power headroom report.

A full power headroom report may be transmitted on a MAC-CE when there is enough UL resource on the L1 channel. For example, the full power headroom report may be used when PUCCH has a large enough allocation to support the MAC-CE. A full power headroom report may be transmitted in association with the PUCCH or with both the PUCCH and PUSCH. Three report types may be defined according to the physical channels transmitted with the report: 1) PUCCH only, 2) PUSCH only, 3) PUCCH and PUSCH. The Ppucch-unconstrained value may be used to determine the power headroom because the PUCCH is always transmitted with the full power headroom report. When the PUSCH is also transmitted, the power headroom may be based on the Ppusch-unconstrained value or the sum of Ppucch-unconstrained and Ppusch uncontrained. The report type may be preconfigured (e.g., using RRC signaling) or dynamically indicated with a resource allocation for the report. Note that the report type does not have to depend on the contents of the transmission. For example, a PH report including both PUCCH and PUSCH power may be transmitted on either L1 signaling (e.g., on PUCCH) or on MAC-CE (i.e., on PUSCH), even if the transmission does not include both PUCCH and PUSCH, by figuring the power that would have been required to transmit a nominal configuration for the signal (PUCCH or PUSCH) that was not actually transmitted.

In an aspect, the power headroom may be based on a waveform of the uplink transmission. For example, pi/2 binary phase shift keying (bpsk) modulation may be used with direct Fourier transform spread orthogonal frequency division multiplexing (DFT-s-OFDM), which is a waveform having low peak to average power ratio (PAPR). A different maximum power reduction (MPR) value may be used with DFT-s-OFDM due to the lower PAPR. Accordingly, the power headroom calculation may be different for OFDM, DFT-s-OFDM, and DFT-s-OFDM with pi/2 BPSK. Because the waveform may be dynamically selected, power headroom reporting component 156 may dynamically select which power headroom to report. The selected power headroom calculation may be configured by RRC signaling, or indicated with the uplink resources for the power headroom report. In another example, where the power headroom report is dynamically scheduled based on timing, a full power headroom report on MAC-CE may depend on a waveform of a PUSCH transmitted with the report. For example, the UE 110 may be configured not to use the pi/2 bpsk or DFT-s-OFDM calculation when L1 signaling is used. As another example, the UE 110 may be configured to use the pi/2 bpsk or DFT-s-OFDM calculation only if a PUSCH transmission using pi/2 bpsk modulation is within the reporting window 224.

Figure 3:
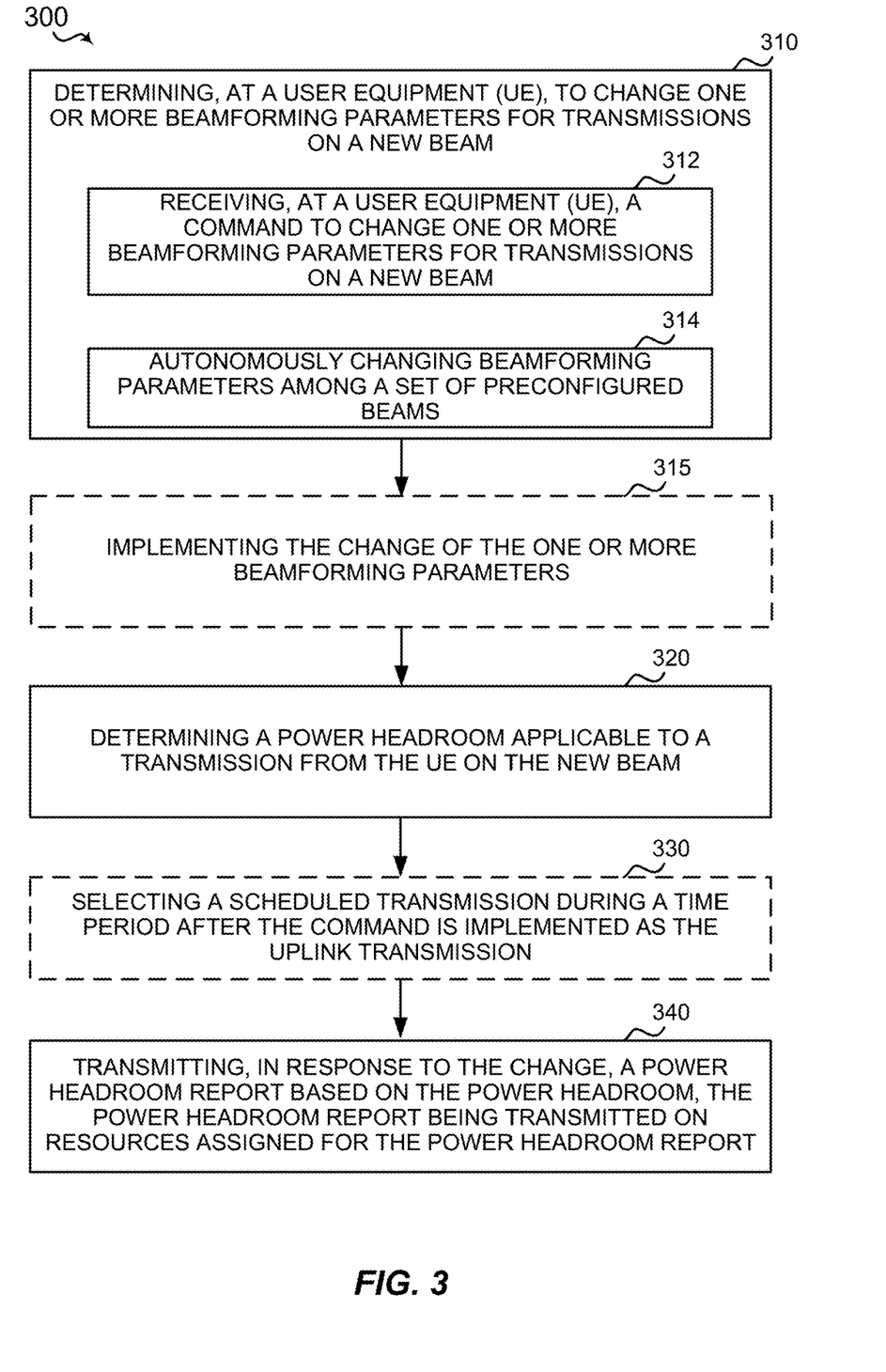
FIG. 3 is a flow diagram of an example of a method of transmitting a power headroom report.

Referring to FIG. 3, for example, a method 300 of wireless communication in operating UE 110 according to the above-described aspects to report power headroom includes one or more of the herein-defined actions.

For example, at 310, method 300 includes determining, at a UE, to change one or more beamforming parameters for transmissions on a new beam. For instance, in an aspect, the UE 110 may execute the beamforming component 152 to change one or more beamforming parameters for transmissions on a new beam. For example, at block 312, block 310 may include receiving, at the UE, a command to change one or more beamforming parameters for transmissions on a new beam. For instance, in an aspect, the UE 110 may execute the power headroom component 150 to receive the command to change one or more beamforming parameters for transmissions on a new beam, as described herein. As another example, at block 314, the block 310 may include autonomously changing beamforming parameters among a set of preconfigured beams. For instance, the UE 110 may execute the beamforming component 152 to autonomously change beamforming parameters among a set of preconfigured beams. For example, the beamforming component 152 may select a beam based on inertial, gravitational, or magnetic measurements.

At 315, the method 300 may optionally include implementing the change of the one or more beamforming parameters. In an aspect, for example, the UE 110 may execute the beamforming component 152 to implement the change of the one or more beamforming parameters. For example, the beamforming component 152 may change the beamforming parameters during the implementation window 222.

At 320, the method 300 includes determining a power headroom applicable to a transmission from the UE on the new beam. In an aspect, for example, the UE 110 may execute the PH determining component 154 to determine a power headroom applicable to a transmission from the UE 110 on the new beam. The power headroom may be based on a transmission waveform of the PUSCH.

At 330, the method 300 may optionally include selecting a scheduled transmission during a time period after the command is implemented as an uplink transmission for carrying a power headroom report. In an aspect, for example, the UE 110 may execute the PH reporting component 156 to select a scheduled transmission (e.g., transmission 240 or PUSCH 250) during a reporting window 224 as the uplink transmission. For example, selecting the scheduled transmission may be based on a priority of a transmission type of the scheduled transmission.

At 340, the method 300 includes transmitting, in response to the change, a power headroom report based on the power headroom, the power headroom report being transmitted on resources assigned for the power headroom report. In an aspect, for example, the UE 110 may execute the PH reporting component 156 to transmit, in response to the change, a power headroom report based on the power headroom. The power headroom report may be multiplexed with an uplink transmission from the UE using the new beam. For example, the uplink transmission may be a physical layer signal. In one implementation, the physical layer signal may be uplink control information (UCI) of a PUCCH. The PH reporting component 156 may encode the power headroom report along with the UCI and transmit the power headroom report and UCI using a grant for the UCI on the PUCCH. In another implementation, the PH reporting component 156 may separately encode the power headroom report and transmit the power headroom report and UCI using a grant for the UCI on the PUCCH. In another aspect, the power headroom report may be multiplexed with a scheduling request as a selected sequence from a plurality of sequences for the scheduling request. In yet another aspect, the power headroom report may be carried over a sounding reference signal as a selected sequence from a plurality of sequences for the sounding reference signal. The power headroom report may include a quantized change in beamforming gain or power headroom value caused by the change of beamforming parameters. The quantized value may be based on a capability of the UE 110. In another aspect, the PH reporting component 156 may transmit the power headroom report on MAC-CE. In another aspect, the power headroom report may be transmitted on a separate transmission scheduled for the power headroom report, for example, scheduled by the beam-switch command. Additionally, in some cases, the power headroom report may not be transmitted using the new beam, but may be determined using nominal values for the new beam.

Figure 4:
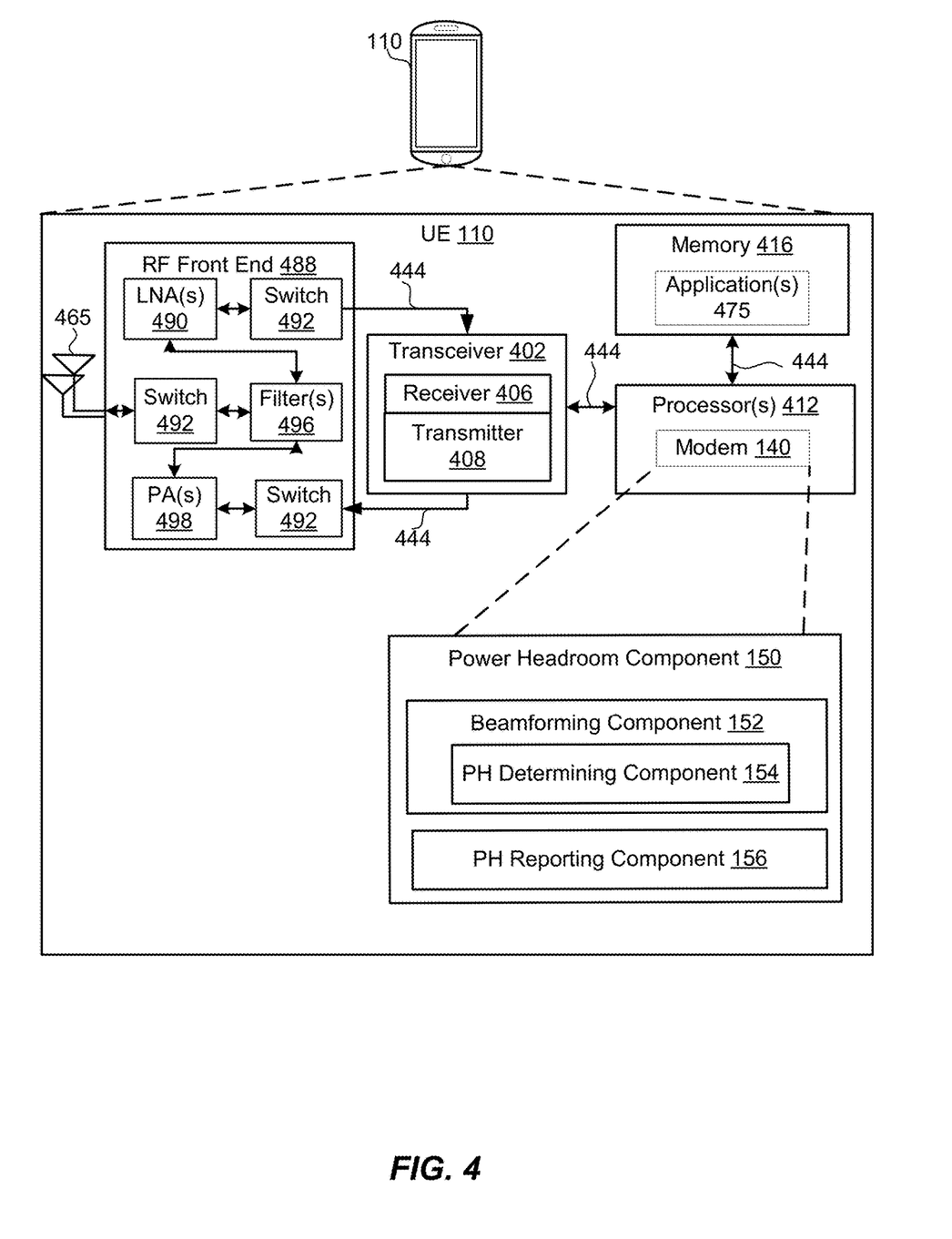
FIG. 4 is a schematic diagram of example components of the UE of FIG. 1.

Referring to FIG. 4, one example of an implementation of a UE 110 may include a variety of components, some of which have already been described above, but including components such as one or more processors 412 and memory 416 and transceiver 402 in communication via one or more buses 444, which may operate in conjunction with a modem 140 and power headroom component 150 to enable one or more of the functions described herein related to reporting power headroom Further, the one or more processors 412, modem 414, memory 416, transceiver 402, RF front end 488 and one or more antennas 465, may be configured to support voice and/or data calls (simultaneously or non-simultaneously) in one or more radio access technologies.

In an aspect, the one or more processors 412 can include a modem 140 that uses one or more modem processors. The various functions related to power headroom component 150 may be included in modem 140 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 140 associated with power headroom component 150 may be performed by transceiver 402.

Also, memory 416 may be configured to store data used herein and/or local versions of applications 475 or power headroom component 150 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining power headroom component 150 and/or one or more of its subcomponents, and/or data associated therewith, when the UE 110 is operating at least one processor 412 to execute the power headroom component 150 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a radio frequency (RF) receiver. In an aspect, receiver 406 may receive signals transmitted by at least one base station 105. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may including, but is not limited to, an RF transmitter.

Moreover, in an aspect, the UE 110 may include RF front end 488, which may operate in communication with one or more antennas 465 and transceiver 402 for receiving and transmitting radio transmissions, for example, wireless communications transmitted by at least one base station 45 or wireless transmissions transmitted by UE 110. RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, the LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, the RF front end 488 may use one or more switches 492 to select a particular PA 498 and its specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 402 to operate at a specified frequency and power level based on the UE configuration of the UE 110 and the communication protocol used by modem 140.

In an aspect, modem 140 can be a multiband-multimode modem, which can process digital data and communicate with transceiver 402 such that the digital data is sent and received using transceiver 402. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 5:
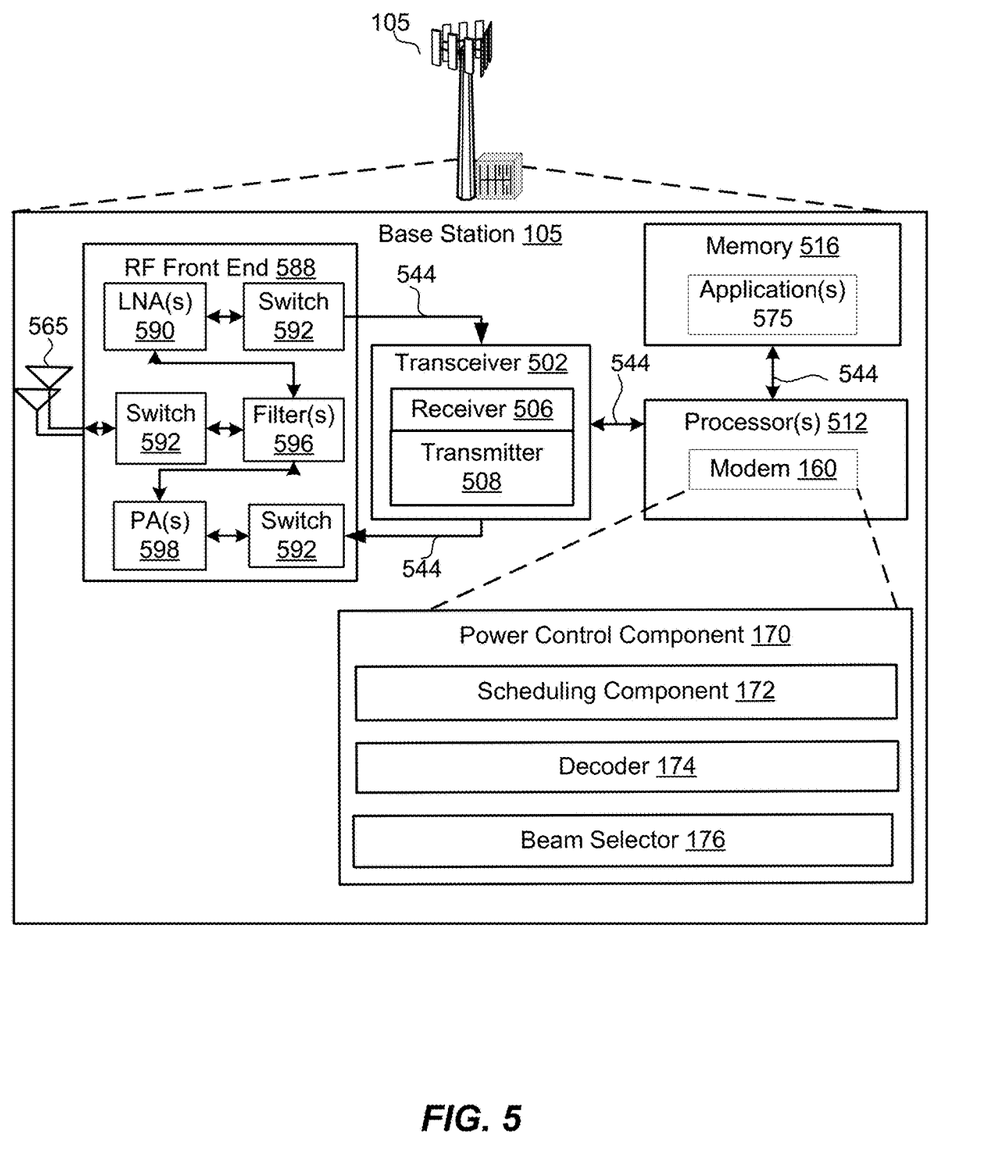
FIG. 5 is a schematic diagram of example components of the base station of FIG. 1.

Referring to FIG. 5, one example of an implementation of base station 105 may include a variety of components, some of which have already been described above, but including components such as one or more processors 512 and memory 516 and transceiver 502 in communication via one or more buses 544, which may operate in conjunction with modem 160 and power control component 170 to enable one or more of the functions described herein related to receiving power headroom reports.

The transceiver 502, receiver 506, transmitter 508, one or more processors 512, memory 516, applications 1075, buses 544, RF front end 588, LNAs 590, switches 592, filters 596, PAs 598, and one or more antennas 565 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
    determining, at a user equipment (UE), to change one or more beamforming parameters for transmissions on a new beam;
    determining a power headroom applicable to a transmission from the UE on the new beam; and
    transmitting, in response to the change, a power headroom report based on the power headroom, the power headroom report being transmitted on resources assigned for the power headroom report, wherein the transmitting comprises transmitting the power headroom report as a physical layer signal, wherein the power headroom report is multiplexed with a scheduling request as a selected sequence from a plurality of sequences for the scheduling request, multiplexed with a sounding reference signal as a selected sequence from a plurality of sequences for the sounding reference signal, or transmitted with uplink control information (UCI) using a grant for the UCI on a physical uplink control channel (PUCCH).

2. The method of claim 1, wherein determining to change the one or more beamforming parameters is based on the UE autonomously changing among a set of preconfigured beams.

3. The method of claim 1, wherein determining to change the one or more beamforming parameters is based on the UE receiving a command to change the one or more beamforming parameters.

4. The method of claim 3, wherein the command indicates the resources assigned for the power headroom report.

5. The method of claim 3, further comprising selecting a scheduled transmission during a time period after the command is implemented as the resources assigned for the power headroom report.

6. The method of claim 5, wherein selecting the scheduled transmission is based on a priority of a transmission type of the scheduled transmission.

7. The method of claim 1, wherein the resources assigned for the power headroom report are also assigned to another uplink transmission.

8. The method of claim 1, wherein transmitting the power headroom report comprises:
encoding the power headroom report along with the UCI; and
transmitting the power headroom report and the UCI using the grant for the UCI on the PUCCH.

9. The method of claim 1, wherein transmitting the power headroom report comprises:
separately encoding the power headroom report; and
transmitting the power headroom report and the UCI using the grant for the UCI on the PUCCH.

10. The method of claim 1, wherein transmitting the power headroom report comprises transmitting the power headroom report that is multiplexed with the scheduling request as the selected sequence from a plurality of sequences for the scheduling request.

11. The method of claim 1, wherein transmitting the power headroom report comprises transmitting the power headroom report that is multiplexed with the sounding reference signal as the selected sequence from a plurality of sequences for the sounding reference signal.

12. The method of claim 1, wherein the power headroom report includes a quantized change in beamforming gain or power headroom value caused by the change of beamforming parameters.

13. The method of claim 12, wherein the quantization of the change is based on a capability of the UE.

14. The method of claim 1, wherein determining the power headroom is based on a transmission waveform of a physical uplink shared channel (PUSCH).

15. A user equipment (UE), comprising:
a memory; and
a processor in communication with the memory;
wherein the processor is configured to:
determine, at the UE, to change one or more beamforming parameters for transmissions on a new beam;
determine a power headroom applicable to a transmission from the UE on the new beam; and
transmit, in response to the change, a power headroom report based on the power headroom, the power headroom report being transmitted on resources assigned for the power headroom report, wherein the processor is configured to transmit the power headroom report as a physical layer signal, wherein the power headroom report is multiplexed with a scheduling request as a selected sequence from a plurality of sequences for the scheduling request, multiplexed with a sounding reference signal as a selected sequence from a plurality of sequences for the sounding reference signal, or transmitted with uplink control information (UCI) using a grant for the UCI on a physical uplink control channel (PUCCH).

16. The UE of claim 15, wherein the processor is configured to determine to change the one or more beamforming parameters based on the UE autonomously changing among a set of preconfigured beams.

17. The UE of claim 15, wherein the processor is configured to determine to change the one or more beamforming parameters based on the UE receiving a command to change the one or more beamforming parameters.

18. The UE of claim 17, wherein the command indicates the resources assigned for the power headroom report.

19. The UE of claim 17, wherein the processor is configured to select a scheduled transmission during a time period after the command is implemented as the resources assigned for the power headroom report.

20. The UE of claim 19, wherein the processor is configured to select the scheduled transmission based on a priority of a transmission type of the scheduled transmission.

21. The UE of claim 15, wherein the resources assigned for the power headroom report are also assigned to another uplink transmission.

22. The UE of claim 15, wherein the processor is configured to transmit the power headroom report multiplexed with the scheduling request as the selected sequence from the plurality of sequences for the scheduling request.

23. The UE of claim 15, wherein the processor is configured to transmit the power headroom report multiplexed with the sounding reference signal as the selected sequence from the plurality of sequences for the sounding reference signal.

24. The UE of claim 15, wherein the power headroom report includes a quantized change in beamforming gain or power headroom value caused by the change of beamforming parameters.

25. A user equipment, comprising:
means for determining, at a user equipment (UE), to change one or more beamforming parameters for transmissions on a new beam;
means for determining a power headroom applicable to a transmission from the UE on the new beam; and
means for transmitting, in response to the change, a power headroom report based on the power headroom, the power headroom report being transmitted on resources assigned for the power headroom report as a physical layer signal, wherein the power headroom report is multiplexed with a scheduling request as a selected sequence from a plurality of sequences for the scheduling request, multiplexed with a sounding reference signal as a selected sequence from a plurality of sequences for the sounding reference signal, or transmitted with uplink control information (UCI) using a grant for the UCI on a physical uplink control channel (PUCCH).

26. A non-transitory computer-readable medium storing computer code executable by a processor of a user equipment (UE) for wireless communications, comprising code to:
- determine, at the UE, to change one or more beamforming parameters for transmissions on a new beam;
- determine a power headroom applicable to a transmission from the UE on the new beam; and
- transmit, in response to the change, a power headroom report based on the power headroom, the power headroom report being transmitted on resources assigned for the power headroom report as a physical layer signal, wherein the power headroom report is multiplexed with a scheduling request as a selected sequence from a plurality of sequences for the scheduling request, multiplexed with a sounding reference signal as a selected sequence from a plurality of sequences for the sounding reference signal, or transmitted with uplink control information (UCI) using a grant for the UCI on a physical uplink control channel (PUCCH).

* * * * *